H. W. Chamberlin.
Envelope Mach.
N° 99,290. Patented Feb. 1, 1870.
Fig. 2.
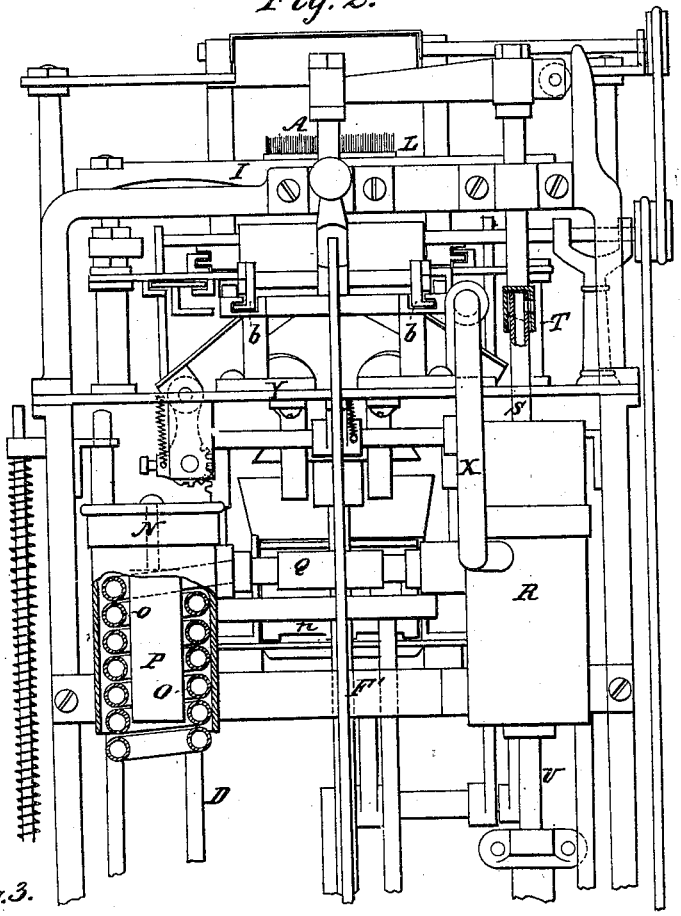
Fig. 3.
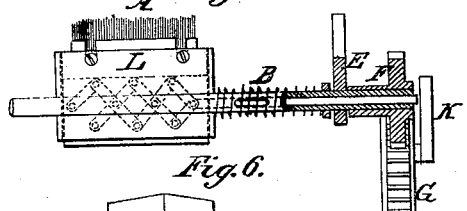
Fig. 4.
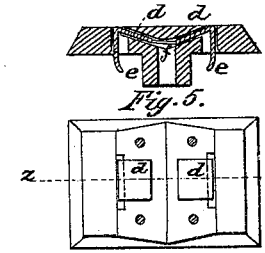
Fig. 6.
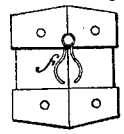
Fig. 5.
Witnesses.
Wm A Morgan
E. G. Collins
Inventor
H. W. Chamberlin.
pr Munn & Co.
Attorneys.

H. W. Chamberlin. Sheet 3. 3 Sheets.
Envelope Mach.
Nº 99,290. Patented Feb. 1, 1870.

Front View  Side View

Inventor
H. W. Chamberlin.
Pr Munn &c
Attorneys.

Witnesses.
Wm A. Morgan
E. G. Collins

United States Patent Office.

HENRY W. CHAMBERLIN, OF NEW YORK, N. Y.

Letters Patent No. 99,290, dated February 1, 1870.

IMPROVEMENT IN ENVELOPE-MACHINES.

The Schedule referred to in these Letters Patent and making part of the same.

*To all whom it may concern:*

Be it known that I, HENRY W. CHAMBERLIN, of the city, county, and State of New York, have invented a new and useful Improvement in Envelope-Machines; and I do hereby declare that the following is a full, clear, and exact description thereof, which will enable those skilled in the art to make and use the same, reference being had to the accompanying drawings, forming part of this specification.

This invention relates to new and useful improvements in machines for making envelopes, but having more particular reference to the operation of gumming, drying, and finishing the same; and The invention consists in the mechanism provided for performing the several movements and operations whereby the envelope is gummed and dried by machinery.

The invention also consists in improvements in the mechanical details and appendages of the machine, as will be hereinafter more fully described.

Figure 2 is a vertical back view, with parts broken away.

Figure 3 is a detail view, in section, of the mechanism provided for operating the gumming-brush, the section being through the line $y\ y$ of fig. 1.

Figure 4 is a section in detail of the plunger plate, through the line $z\ z$ of fig. 5.

Figure 5 is a plan view of the plunger-plate or foundation, with a portion of the top removed.

Figure 6 is a view of the under side of the middle top piece of the foundation.

Figure 7:
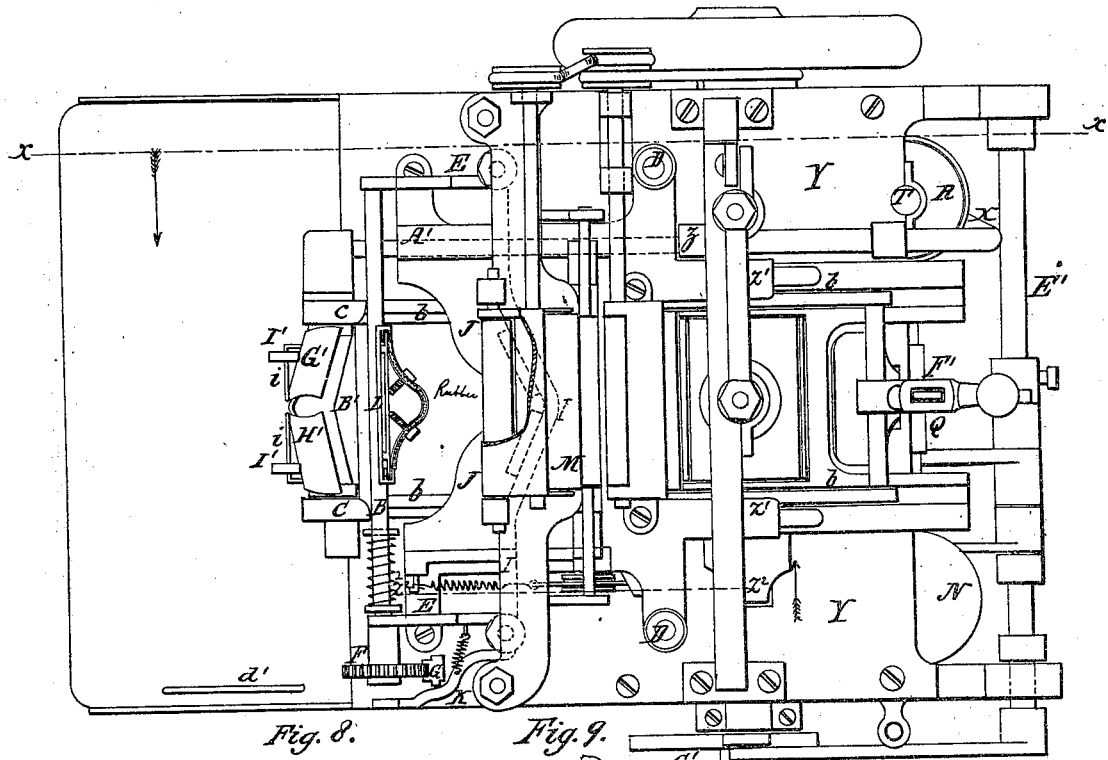

Figure 7, Sheet II, is a top view of the machine.

Figures 8, 9:
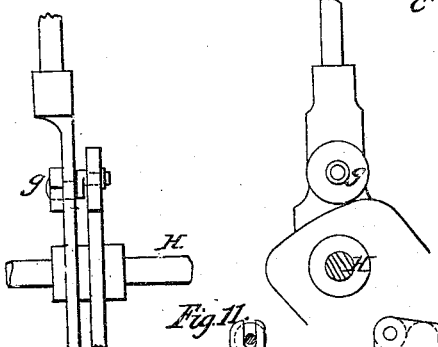

Figure 8 is a detail front view of the double eccentric-pin.

Figure 9 is a detail side view of the same.

Figure 10:
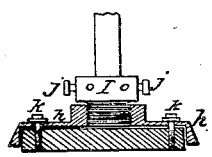

Figure 10 is a central vertical section of the plunger, through the line $z^1\ z^1$.

Figure 11:
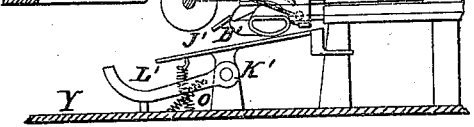

Figure 11 is a detailed section, through the line $z^2\ z^2$, looking in the direction of the arrow.

Figure 12:
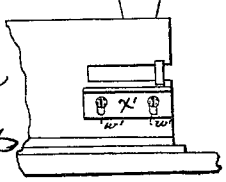

Figure 12 is a side view of the slide and grooved way of the discharger.

Figure 13:
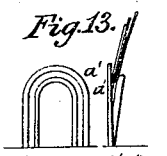

Figure 13, Sheet II, is a front view of the bill-holder.

Similar letters of reference indicate corresponding parts.

The improvements which are hereinafter described have been made with more special reference to what is known as the "Ray envelope-machine," but which are either (in whole or in part) applicable to other machines for the same purpose; and The chief features of my invention relate to the gumming of the seal-tab and the drying of the same, and improvements in the plunger for regulating the thickness of the envelope to fill a given length of box. Also, in the foundation for preventing blemishes on the address-side of the envelope. Also, providing a double eccentric for regulating the foundation and plunger.

Another important feature is a greatly-improved discharger, whereby the sealed tab is prevented from passing under the opposite tab, as also to prevent bending of the edges of the envelope, and thereby preventing marks on the address-surface, and leaving the strength of the paper unimpaired, therefore requiring less thickness of fold to fill a box of given length, and consequently favoring the discharge of the finished envelope.

In describing these improvements, I will commence with the gumming-process, which, it will be understood, is confined to the seal-tab.

Figure 1:
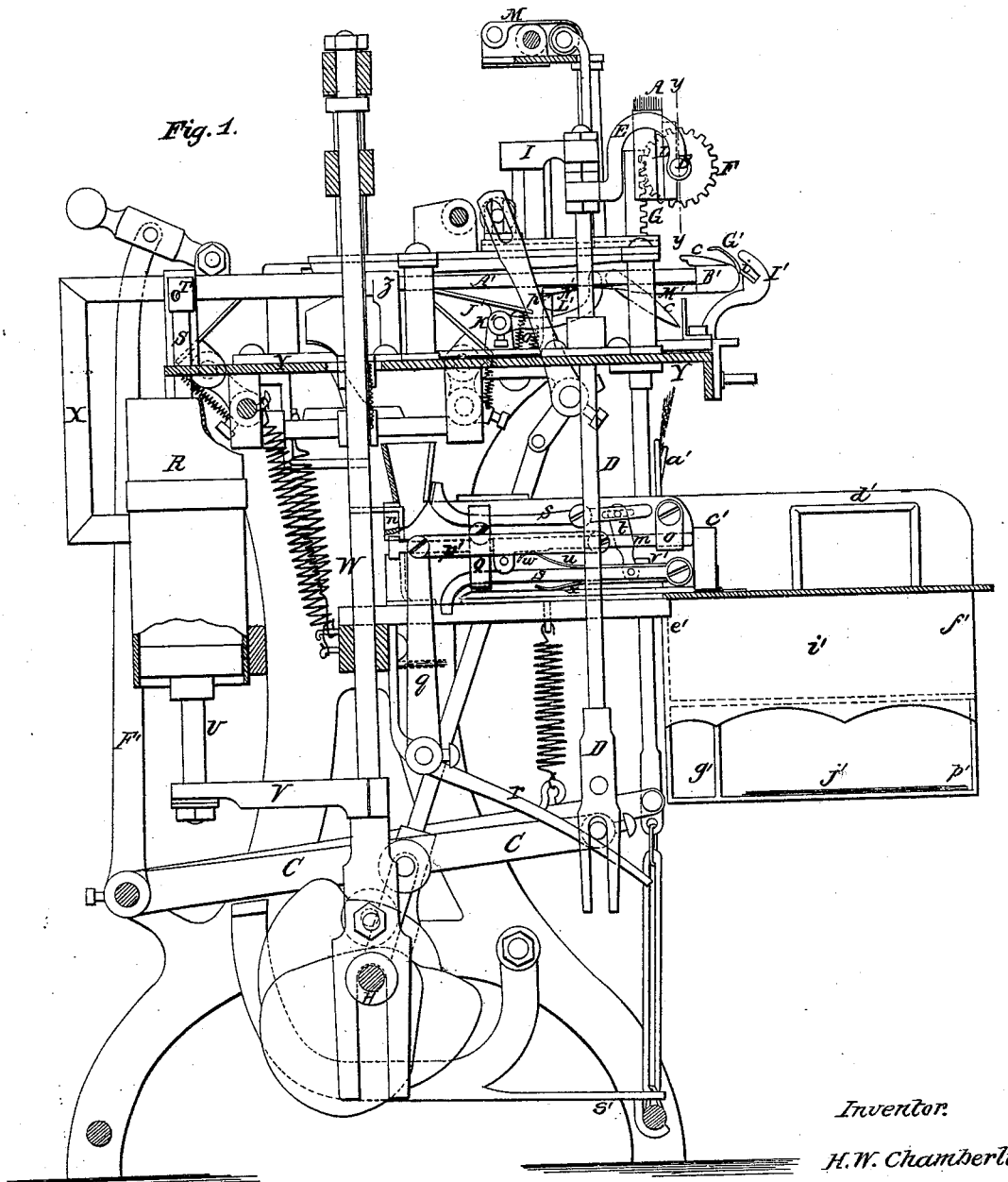
Figure 1 is a vertical section of the machine, through the line $x\ x$ of fig. 7, Sheet II, looking in the direction of the arrow.

The envelopes are placed on the sliding plate, in the usual manner with this machine, where the top blank is gummed by the gumming-brush, which is marked A, seen in figs. 1 and 2. This brush is attached to a semi-revolving shaft, B.

A vertical motion is imparted to this brush-shaft by a revolving cam, operating on cam-levers C, which motion is conveyed by rods D to curved arms E, which arms are made adjustable by nuts on the rods, and form bearings for the shaft to revolve in.

F is a pinion on the shaft, which engages with a rack, G.

This rack has a vertical movement imparted to it by a cam and lever on the main shaft; and I will say here that all the principal movements are derived from cams on the main shaft, which is marked H.

I is the picker-bar, seen in dotted lines in fig. 7, Sheet II, which is attached at each end to the rods D. The pickers are attached to this bar, and stand vertical.

J, fig. 7, is the detaching-plate, through which the pickers work. While the picker-bar and brush are at nearly their highest point, the two gum-rollers move in unison.

One roller first deposits gum on the pickers, after which the pickers are slightly raised to their highest point, and gum is deposited on the brush by the other roller, as both rollers return to their previous position. The picker-bar then descends, while the rack remains stationary sufficiently long to allow the brush to make one half of a revolution.

At this point a loose adjustable arm, marked K, on the rod D, (see fig. 7,) falls into a recess in the side of the rack, and holds the rack suspended while it moves in unison with the pickers to the surface of the paper, wherever the surface may be. The brush strikes the paper a little in advance of the pickers.

The pressure which is brought to bear upon the brush by the weight of the parts moving therewith, acts on the lazy-tongs, (seen in fig. 3,) which serves to disengage the arm K from the rack, which, through its lever, drops into the recess of its cam, thus carrying the brush back to an upright position, from which point the brush and picker rise in unison to receive their gum, as before described. The mechanism immediately connected with the brush is seen in fig. 3.

The shaft B is made tubular, with a sliding rod, which has a pin through it, which works in a slot in the larger or tubular part, as seen in the drawing. Around the shaft there is a spiral spring, which acts upon the pin.

The lazy-tongs are attached to this sliding rod, and when the brush is pressed on the paper, it slides on the plate L, (which plate is stationary on the shaft,) and extends the lazy-tongs, which pushes the rod outward sufficiently far to detach the arm K, as before mentioned.

There is a small counter-spring attached to the arm K, the tendency of which is to draw the arm back, and keep it in contact with the rack.

When the brush leaves the paper, the spiral spring on the shaft recoils, and forces back the rod and compresses the lazy-tongs ready for repeating the operation, i. e., gumming the envelopes.

Over the roller from which the brush receives its gum, I place a shield, M, (seen in fig. 7,) which shield is designed to cover the roller, and to prevent the too rapid evaporation of the volatile drier used in combination with the gum.

The gum deposited on the seal-tab of the envelope is dried almost instantaneously by the application of heated air, and the apparatus provided for heating and applying the heated air, I will now proceed to describe.

N is a cylindrical metallic case, open at the lower end, containing a hollow coil, O, (through which the heated air passes,) around a central core, P.

Q is a pipe, which connects the upper end of the coil with the force-pump R. There is a valve at the end of this connecting-pipe, which opens inwardly, so that it will close from pressure in the pump.

Transversely across the pump there is a diaphragm or partition-plate, which has a valve opening upward; and above the diaphragm there is a follower, the stem or rod of which is seen at S, fig. 1.

This rod is hollow, and it has a regulating-cap, T, with an aperture for the discharge of the surplus air as the follower ascends and descends.

Beneath the diaphragm there is a piston, to which motion is imparted by a cam on the main shaft.

U is the piston-rod, and

V is the arm, which is attached to the cam-rod W, by which the piston is actuated.

X is a pipe, which is attached to the pump between the diaphragm and the follower, through which pipe the hot air is discharged from the pump.

This pipe is properly supported by stands on the main plate Y of the machine.

This pipe is stationary, and terminates at the point Z, where another smaller pipe, A', slides into it.

The extreme end of this pipe A' is enlarged, forming a sort of piston, which reduces friction between the two pipes, and prevents the soiling of the work from the oil, which would otherwise adhere to the small pipe.

B' is the cross-head, with which the pipe A' is rigidly connected by screw-threads or otherwise.

The cross-head is attached to rods b, which slide horizontally in ways.

Motion is imparted from the outside cam C', fig. 7, by means of the drop-arm D', which is attached to the horizontal rock-shaft E', (same figure,) and the upright arm F', seen in fig. 1.

The upper portion of the cross-head is provided with two hollow or chambered sections, G' and H', fig. 7.

These sections are hinged on their front edges, so as to open upward, and they stand at an angle with each other, so as to conform to the shape of the tab.

They are opened when drawn forward by the oblique slots in the stationary arms I', fig. 1, acting on the loop wires i i, which are attached to the hinged sections.

When thus opened, they receive the gummed tab of the envelope, and close down on to it as they start in their backward movement to carry the blank to its proper position under the plunger.

While the gummed tab is thus held beneath the sections, it is subjected to the action of the heated air which is discharged into the chambers, under the sections, from the pipe A'.

When the blank is carried nearly to its proper position under the plunger, the sections are opened by the action of two fingers, which act in concert. The said fingers are actuated by the discharge end of the cross-head, through a cord-pulley and counter-spring, as seen in detail in fig. 11.

J' is an inclined apron, supported on stands on the plate Y, and

K' is a rock-shaft, supported by the same stands, to which the apron is hung, which shaft has a curved finger upon each of its ends, as seen at L', fig. 1.

M' is a bar, extending back from the cross-head, to which it is secured near and parallel to the pipe A'.

On this bar is placed the inclined plane N', which, in the backward movement of the cross-head, passes over a pin in the side and near the top of one of the fingers L', but on its return movement, it raises the fingers L', which are connected with the shaft K', a counter-spring, o, and a spring-catch, p.

This catch reacts against the side of the bar N', which, in its backward movement, releases the fingers L' from the catch, but which, on its return, (a portion of the bar being formed as a flat spring,) enables the end of the bar to pass over the head of the catch, by means of an incline on its under side.

It will be understood that the blank is gummed before it is lifted by the picker, and it is lifted after the cross-head has moved back beyond the picker, so that on its return movement, the cross-head passes under the blank, which blank is then released from the pickers and drops upon the rods b b, just back of the hook c, and slightly in advance of the fingers L'.

The said fingers detain the blank until the cross-head has moved backward sufficiently far for the drying sections to receive and close down upon the gummed seal-tab.

When the tab is thus secured, the fingers drop out of the way, and the cross-head, with the blank, continues its movement to the plunger.

I have made important improvements in both the plunger and foundation of this machine.

The former is seen detached in fig. 10, Sheet II, which represents a vertical section.

The latter is seen in detail in figs. 4, 5, and 6, Sheet I.

The hooks which pass up through the bed, for raising the envelope, strike the lower curved part of the angular plates d d, at the point e, which forces them toward the centre, and from the apertures through the bed. At all other times, these angle-plates keep those apertures closed, so that the envelope is not marred in the process of folding.

The spring f, seen in fig. 6, forces those plates back, and keeps the apertures closed, except when they are forced inward by the hooks, as before mentioned, for raising the envelope.

The edges of the foundation or bed are bevelled off, as seen in the drawing, to prevent the wrinkling of the paper in folding.

The position of the plunger is adjusted with the greatest nicety by means of a double eccentric-pin, seen at $g$, fig. 8, Sheet II.

A face view of the eccentric-pin roll, and also the cam, is seen in fig. 9.

By turning the pin, the plunger is raised or lowered more or less, as may be desired.

The plunger is formed, as represented in the drawing, with an adjustable shell, $h$, fig. 10, having a hub with a central aperture, with a screw-thread to fit the movable collar $i$, which rests on the upper surface of the plunger.

This collar $i$ is confined on the plunger-rod by set-screws $j$.

$k$ represents set-screws through the shell and plunger, for adjusting and keeping the plunger firmly in position.

Holes are made in the collar $i$, by which the collar is turned and set by a properly-constructed wrench.

The discharge-bar $m$, and pusher-plate $n$, seen in fig. 1, are operated by a transverse rod, which connects the rods D, by which the pickers are actuated.

The bar $m$ is square-cornered, and slides in square apertures or bearings, $o\ o$.

The plate $n$ is screwed to this bar in a position at right angles with its motion.

$p'$ is a rod, which connects the discharge-bar $m$ with the vertical connecting-bar $q$.

$r$ is a discharge-lever, to which motion is imparted from the bar of the picker-cam.

$s\ s$ are jaws, which are placed in a horizontal position. One is moved up and the other down, so as to allow the envelope to pass through without bending the edges.

$t$ is a cross-tie, by which the two jaws are connected, the lower end of which tie is fastened to the jaw, forward of its centre of motion. The upper end is graduated by means of a slot in the jaw, back of its centre of motion.

$u$ is a spring, attached to the lower jaw at V', with its opposite end in the form of an inclined plane, resting on the flat surface of the jaw at $w$, and $x$ is its counter-spring.

Fig. 12 represents a bearing at the opposite end of the discharge-bar and plate, resting on a grooved plate on the outside of the discharge-box, which plate $x'$ is made adjustable vertically by set-screws $w'$ and slots, as seen in the figure.

Other improvements, relating to the details of the machine, are seen in fig. 1.

$a'$ is a bill-holder, made of two wire loops, one smaller, surrounded by the larger. The upper end of the larger is turned slightly back, and the top of the smaller is turned forward to guide the bill readily to its place.

$c'$ is a band-box, hung on hinges at its lower edge, which, when closed, forms the top and front thereof.

$d'$ represents the "second-quality holder," which is formed of wire, and stands parallel with the side of the table, and far enough from it to hold a little more than a pack, or twenty-five envelopes.

$e'$, $f'$, $g'$, and $h'$, represent a box, fastened underneath the right-hand end of the table, the division $i'$ being designed for holding second-quality box till it is filled, and the lower part, $h'$, for holding gum-cups.

The division $g'$ is a waste-holder.

There is also a tin or metallic plate foundation or pan for the gum-cups to rest on to catch the drip, which pan can be withdrawn at any time for cleaning. This pan is seen at $j'$ in red color.

I do not confine myself to any particular arrangement for heating the air to be used in drying the gum. It is conveyed into the machine through the coil O, already described.

S' represents the stop-lever for elevating the gum-brush and pickers, and holding them while the blanks are being placed in the machine.

I claim as new, and desire to secure by Letters Patent—

1. The mechanism herein described, the chief elements of which are the roller B, brush A, rack G, rods D and E, and cam-levers C, for depositing the gum on the seal-tab of the envelope, substantially as set forth.

2. The combination of the coil O, pipe Q, pump R, tubes X and A', and the cross-head B', by which air, artificially heated, and either with or without driers combined with the gum, is forced, in a constant blast or current, on and beneath the gummed surface, while the tab is contained in its air or drying-chamber, and during its passage to the plunger, substantially as described.

3. The adjustable plunger, constructed substantially as described, for the purposes specified, viz, for folding paper thicker or thinner.

4. The mechanism, viz, bent levers $d\ d$, operated by spring $f$, by which the apertures in the foundation are closed while the envelope is in process of formation, substantially as and for the purpose specified.

5. The pusher $m\ n$, for discharging the envelopes, constructed and operating with the parts connected therewith, consisting of the jaws $s\ s$, rod $p'$, springs $u$ and $x$, cross-tie $t$, and discharge-lever $r$, and bar $q$, substantially as described.

6. The double eccentric-pin, in combination with an envelope-machine, substantially as and for the purposes set forth.

7. The combination of the hinged shield M with roller B, operating as set forth.

8. The stop-lever S', by which gum-brush and picker are held above the action of the cams while the envelope-blanks are being placed in the machine.

9. The apron J', when arranged on pivots, and retained in place by the counter-spring $o$, so as to operate as and for the purpose set forth.

Witnesses:     HENRY W. CHAMBERLIN.
   FRANK BLOCKLEY,
   ALEX. F. ROBERTS.